(12) United States Patent
Ewald

(10) Patent No.: US 8,271,358 B2
(45) Date of Patent: Sep. 18, 2012

(54) METHOD FOR SINGLE-SCREEN ORDERING OF BACKGROUND CHECKING SERVICES OF A POTENTIAL EMPLOYEE

(75) Inventor: Walter Michael Ewald, Berkeley Heights, NJ (US)

(73) Assignee: Mesh, Union, NJ (US)

( * ) Notice: Subject to any disclaimer, the term of this patent is extended or adjusted under 35 U.S.C. 154(b) by 75 days.

(21) Appl. No.: 13/065,489

(22) Filed: Mar. 23, 2011

(65) Prior Publication Data

US 2011/0173091 A1 Jul. 14, 2011

Related U.S. Application Data

(63) Continuation-in-part of application No. 11/648,879, filed on Jan. 3, 2007, now abandoned.

(51) Int. Cl.
*G06Q 30/00* (2006.01)
(52) U.S. Cl. ...................................................... 705/27.1
(58) Field of Classification Search ................. 705/26.8, 705/27.1, 26.1
See application file for complete search history.

(56) References Cited

U.S. PATENT DOCUMENTS

| | | | |
|---|---|---|---|
| 6,202,066 B1 * | 3/2001 | Barkley et al. | 707/785 |
| 6,714,944 B1 * | 3/2004 | Shapiro et al. | 1/1 |
| 2002/0161602 A1 * | 10/2002 | Dougherty et al. | 705/1 |
| 2002/0194502 A1 * | 12/2002 | Sheth et al. | 713/201 |
| 2005/0055231 A1 * | 3/2005 | Lee | 705/1 |
| 2007/0100834 A1 * | 5/2007 | Landry et al. | 707/10 |

OTHER PUBLICATIONS

Cappelli, P. "Making the Most of On-Line Recruiting" Harvard Business Review, 2001, vol. 79; Part 3, pp. 139-148.*

* cited by examiner

*Primary Examiner* — Jeffrey A Smith
*Assistant Examiner* — Matthew Zimmerman

(57) ABSTRACT

A method is described for user customized single screen order taking. The method saves users time to submit subsequent orders by storing their selection of items and having the system use that stored information to avoid selecting the desired items for each subsequent order. In practice, upon initial logon, a menu of items is presented to the user in response to the users inputted identification and password. The user can then select a subset of items from the displayed menu for the present and subsequent logons. The system eliminates duplicates and prioritizes presentation attribute from the selected items. A single data entry screen presenting the specific data entry needs for the selected items then is displayed on the present and subsequent logins. This ordering method also permits the user to save all data entered on a data entry screen in modified or unmodified format for submission at a subsequent time for fulfillment. Additional time is saved by the user in the placement of orders by positioning all required data fields in different regions that the non-required data fields in the data entry screen.

7 Claims, 2 Drawing Sheets

Primary Data Entry Screen

- 200 — Primary
- 201 — Alternate 1
- 202 — Alternate 2
- 225

Goods and Services to Be Ordered: — 207, 208

- 203
- Add Delete  Add Delete  Add Delete
- *Good 1*, *Service 1 [2]*, *Service 2*   [Click to Modify]   [Hide]
- 204

Please Enter the Following Data to Submit an Order for the Above Listed Goods and Services — 205

209

Required Data: — 210

- Field 1: — 211
- Field 2: — 212
- Field 6 [1]: — 213
- Field 6 [2]:

214

Optional Data: — 215

- Field 4: — 216
- Field 9:

217

Service 2: — 218

Required Data: — 219

- Field 10:

220

Optional Data: — 221

- Field 11:

222   223   224

Submit Order   Hold Order   Reset Page

Fig. 2

METHOD FOR SINGLE-SCREEN ORDERING OF BACKGROUND CHECKING SERVICES OF A POTENTIAL EMPLOYEE

CONTINUATION IN PART

The present application is a continuation in part and claims priority to application Ser. No. 11/648,879 which had a filing date of Jan. 3, 2007 now abandoned.

BACKGROUND OF THE INVENTION

1. Field of the Invention

This invention relates generally to the field of Internet-based communications and, more particularly, to a method for taking customer orders using a customized single screen for the input of required ordering data.

2. Description of Prior Art

The explosive growth of the Internet as a publication and interactive communication platform has created an electronic environment that is changing the way business is transacted. Companies often build websites to take orders from customers over the Internet. Many such order-taking systems however, do not save information associated with a specific user for use in enhancing the order taking process. Systems without saved information, typically require the user to select their desired items from a menu or catalog that is the same for all users.

Often data required to fulfill an order for items, such as goods or services, cannot be fully determined until the user selects the desired items for the specific order. Some electronic ordering systems require preliminary data be provided in order to select the appropriate items to be displayed on the ordering menu or catalog. These systems however often result in having the user enter too much or too little information before selecting items to be displayed. Systems requiring preliminary data prior to display of the ordering menu or catalog also don't give the user flexibility to use different data for a field that is common across items, such as last name wherein the user might want to user maiden name to fulfill one service such as college degree verification, but not for the other service such as a credit check.

Many ordering systems use a separate screen to enter data associated with each item to be acquired. This delays the ordering process, as it requires data to be transmitted back and forth across the Internet to generate a new screen for each item. The transmission interval results in a direct delay in the time it takes the user to enter an order, and an indirect delay as it interrupts continuity in the user data entry process.

A number of innovations have been proposed to overcome the above deficiencies and improve the ordering process.

For example, U.S. Pat. No. 7,028,261 presents a method to store information associated with a users activity and actively modifies each browsing experience according to that user's browsing history. While this system can present the user with more appropriate navigation choices, it neither presents a menu of items for order, nor bypasses a menu to display of the data entry screen for the item or items to be ordered.

An electronic ordering process, which employs a user profile to suggest items for purchase that are most likely to be of interest to the user, is described in US Patent Application 20030037041. While this process reduces the number of items offered for selection by the user, product selection is still required before display of the data entry screen for the item or items to be ordered.

US Patent Application 20050091156 identifies a method to correlate content to present to a user with demographic and psychographic data it previously stored for that user. This method can improve the users experience, but it does not let the user select the products and/or services that they want displayed. This process also requires product selection before display of the data entry screen for the product to be ordered.

US Patent Application 20050204276 consists of a framework that uses questionnaires and other methods to gather preference information about a customer, and uses that information to adjust the offer it makes to that customer. This is time consuming for the customer and frequently does not adequately reflect the future needs of the customer for items. The framework also does not directly let customers select the products and/or services that they want displayed. This process also requires product selection by the customer before display of the data entry screen for the product to be ordered.

US Patent Application 20040268228 provides a framework that simplifies the development of customizable web pages. The framework described in this patent application did reduce the development effort to develop many web applications, but it did not introduce new simplifications to the order entry process.

An additional complexity of taking customer orders occurs after items are identified, and specific data are either required or just useful to fulfill the order. Both the "required" data and the "useful" data typically are intermingled on the data entry screen, with the "required" data differentiated graphically via an asterisk or other notation. This intermingling of "required" and "useful" data adds burden and delay to the users that want to enter only the required data.

Inefficiencies further exist in the order entry process, when different items have data requirements for the same field types. In such cases, the user usually wants to use the same data for the same field type of each item, but occasionally needs to use different data. Re-entering the same data for a subsequent number of items is time consuming and burdensome.

US Patent Application Sheth 2002/0195028 provides a framework that for users to add items called monitors to a web page. These monitors are separate elements. Insufficiencies exist in the lack of a process to determine if duplicate data exists across these items, and to prioritize presentation attributes for entering the data based on the data needs of the individual items. Such a process reduces the information needed to be entered and optimizes the data entry process. Furthermore, inefficiencies exist in not eliminating presenting the items themselves the data entry process so the user can just provide the reduced information without being burdened by the items. Furthermore, inefficiencies exist in that the burden of selecting an optimal arrangement of the data entry elements must be done by the user and is only available to the user via the items themselves and not the data entry elements, as opposed to the system making determinations of optimal presentation based on prioritizing the data entry elements presentation attributes.

BRIEF SUMMARY OF THE INVENTION

The above deficiencies are overcome by the present invention, which provides a highly efficient method for single screen electronic ordering of various items such as goods and/or services. The order taking method comprises initially displaying a logon screen on a website to permit the user to logon by inputting a unique username for identification, and a password for authentication. Based on the username, a menu of authorized items is presented on a screen for the user or the system administrator on behalf of the user, to select a primary subset of items from the menu. The selected primary subset of items is stored for the present and subsequent logons and the data entry needs are determined for the selected primary subset of items. A primary data entry screen then is displayed to the user that presents only the data entry needs for the selected primary subset of items during that logged in session. After entry of all requested data, the user may submit an order for fulfillment directly from the displayed data entry screen. Immediately upon subsequent logons, a data entry screen is displayed that presents only the data entry needs of the selected items thereby bypassing display of the items menu and permits order fulfillment from a single data entry screen.

In an enhanced version of the electronic ordering method of this invention, the user is permitted to select from the menu of authorized items, one or more alternate subsets of items that is in addition to the subset of items initially selected. Each alternate subset of items is stored along with the initially selected subset and the data needs are determined for the alternate selected subset of items. A data entry screen that presents only the data entry needs of the selected alternate subset is displayed via a link from the data entry screen for the initially selected subset of items. The displayed screen of data entry needs for the alternate subset of items permits the user to directly submit an order for fulfillment. Additional ordering efficiencies are achieved by positioning required data fields in different regions on the data entry screen than non-required fields. The ordering method of this invention also permits the user to save all data entered on the data entry screen for an item, and subsequently submits the data in modified or unmodified form for fulfillment during the present or subsequent session.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which is illustrated, in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 is an illustration of a computer monitor screen that presents the primary data entry needs for the selected subset of items.

DETAILED DESCRIPTION OF THE INVENTION

Figure 1:
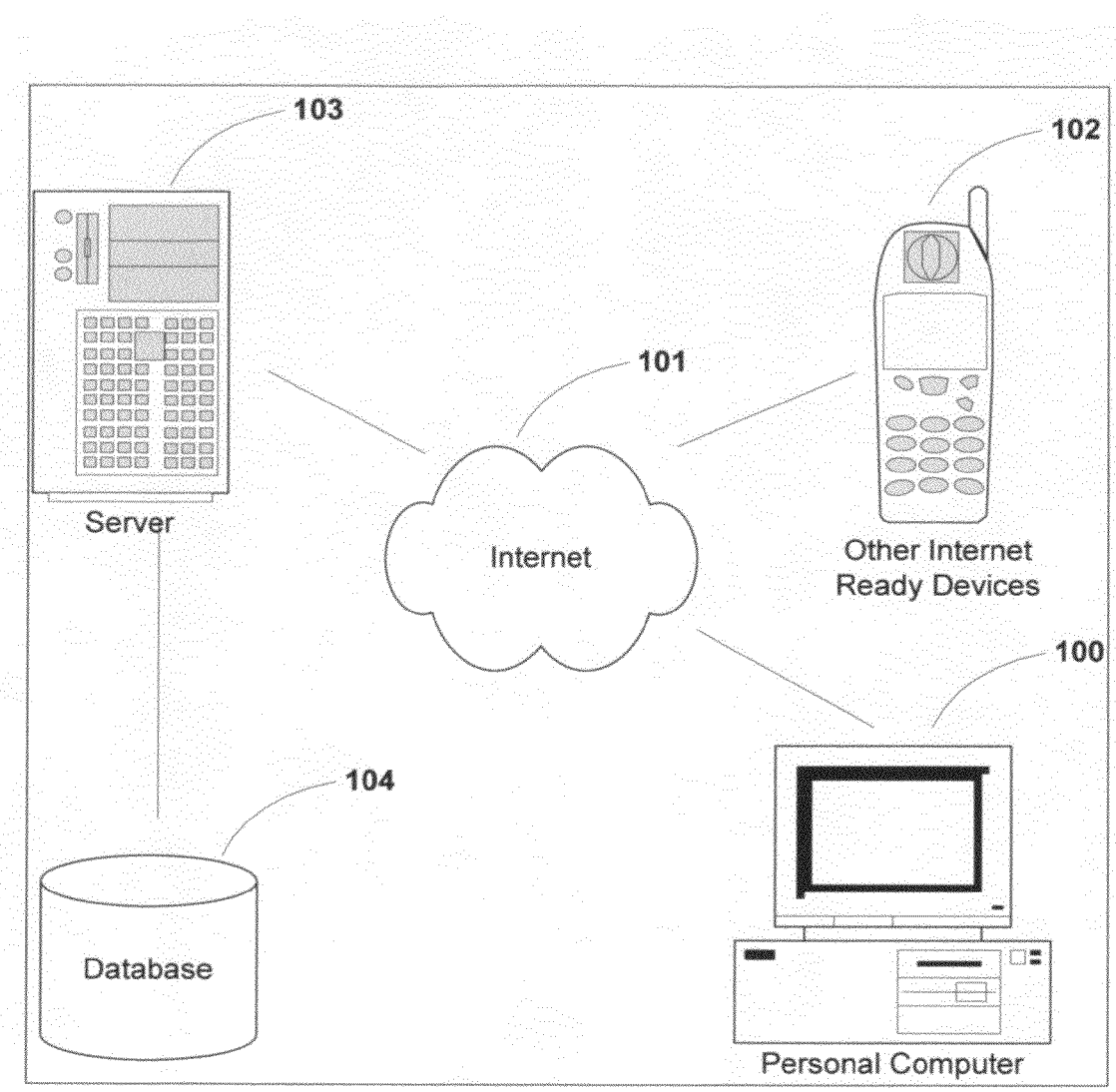
FIG. 1 is a diagram illustrating the environment in which the invention operates.

The present invention extends to a method for user customized single screen order taking. The order taking may be for any items, such as goods/products or services, or a combination of both. The invention via an Internet based application collects information from the user on what items they want to order for the current and subsequent logons. It uses this and stored information on the data entry requirements for these items to remove duplicate data entry needs and to select the highest priority presentation attributes for said items to further improve the data entry process. On subsequent logons, the entire process to have the user select, or actively validate the selection of items, is bypassed which saves the user time so they can just provide the information about the new order in a manner which gains efficiencies from the removal of duplicates, the selection of the highest priority presentation attributes, and other features enabled by this process.

This process is particularly useful for taking orders for background checks on a company's potential employees. In this case, employees of the company, referred to herein as recruiters, wish to place orders for background checks on many potential employees. The recruiters however, cannot place all the orders at once, as the process is triggered by an event such as a job offer. These background checks require providing data specific to each the potential employee such as last name and first name, but much of the other data about the individual is dependent on the specific services to be run on the individual.

Many recruiters run the same services on all their job applicants. In this case, for the many times they return to the website to place a background checking order, with this invention, the recruiter logs into the system, enters information about the applicant such as first name, last name and date of birth and click on submit. They do not need to select or validate services which saves them burden and time. Their services could have been setup by an administrator and so it requires much less training as they need not even know what services they are running. They know their logon information, the applicant's information and with this they can place the background check.

Other recruiters run a different background check depending on the type of position the applicant is applying for. For instance, a recruiter might usually want to run one set of background checking services for non-managers while every once in a while, they hire a manager and in this case, they want to run another set of services. With this invention, they or an administrator select one set of services for the managers and another for the non-managers. Herein, these selected services will be referred to as packages. They name these packages using the terms for the roles that they use, that is managers and non-managers, and they use the non-manager package as their first package so it will be the first data entry screen they see upon logon. So, say the user wants to background check their usual job applicant, that is a non-manager. They logion the system, they enter the information for the applicant such as first name, last name, and Date of Birth and then they click submit and they're done. They don't even have to know how many or which background checking services are being conducted. They just provide the information about the applicant, not background checking and they're done. Now say this same recruiter wants to perform a background check on a manager. They logon to the system and then they click the manager button. They might enter first name, last name, and Date of Birth and then they click submit and they're done. A different set of background checking services will be performed but they don't have to know about that, nor do they have to worry about making a mistake because they got confused by background checking terminology. They use their own terminology such as manager and non-manager.

The invention requires the user only to enter the information that is associated with the item being ordered such as required or optional or recommended data. Many times in a background checking process, the recruiter would have to start out with a screen that requires the user to enter a large amount of information about the applicant without any expectation on whether the information ill have any use in completing the background check. Often this information can include information such as a social security number which also unnecessarily introduces security and privacy risk. This invention avoids these problems.

The list of services or packages can be setup by the user or by an administrator. A system administrator sets the rights for that user such as whether they can change what items are contained in their packages, the names of their packages, and the number of packages. The data requirements for each item are setup by the system administrator. As the data requirements for one item can overlap another item, if both such items are selected, the invention in presenting the data entry screen to the user, goes through a process of eliminating duplicate data requirements. Also, in this process, the invention prioritizes the presentation attributes. For instance, if the Social Security Number (i.e., SSN) is an optional field for one item, but required for another item, and the system administrator setup "Required" as a higher priority than "Optional" then one of the duplicate requests for SSN would be eliminated and SSN would be presented as a "Required" field. These presentation attributes apply to more than just required or optional. A presentation attribute includes what color the field should be shown as. Some fields might be red for some items while others have it as black. If red has a higher priority then it will be shown as red. It can also affect where they are located on the screen as some fields might have a presentation attribute when used in one item that have it located in a different screen position than when it is associated for another item.

For users that have been granted rights by the administrator, they can view, add, modify or delete packages. They can modify the contents of the package and rename the package. They can be restricted by the administrator as to which items they can select and how many items they can add. Depending on their rights, they can view which items are in their package on the data entry screen.

The system administrator can provide administrative rights to users.

The user, as they are entering data, may have to leave the application and return later. To avoid having to re-enter the same data later, they can save the partially completed data for later via clicking on a button.

The user as they are entering data might have realized they no longer want to enter the data in which case they can click on a button to erase all the data they had previously entered on this data entry screen.

Referring more particularly to the environment in which the invention operates is illustrated in FIG. 1. Item 103 in this figure is labeled "Server" and Item 104 is labeled "Database". The invention contains computer code which resides on both of these devices. Via these devices, the computer code, such as an ASP .net 2.0 or ASP .net 3.5 application, is available via the Internet all over the world. The application can be accessed via the Internet using a personal computer shown as Item 100, or other Internet ready devices shown as Item 102.

Referring more particularly to the process overview illustrated in FIG. 2, which displays a data entry screen.

This figure is one that could be displayed upon login, if the user selected services for this screen during a prior login. Item 200 shows that this data entry screen has been labeled "Primary" by the user and selected goods and services shown in Item 225. If the user clicks on Item 208 "Click to Modify" the user would be able to rename this data entry screen and/or change this list of selected goods and services.

Item 203 shows the user selected an item called "Good 1". There is only one of these items selected as there is no number in brackets. Item 204 shows the user selected an item called "Service 1" and in brackets is a "2" which is the quantity of this item. No brackets are used if the quantity is one. Item 205 shows a link to take the user to a screen to modify the items listed on this screen. Item 208 shows a link that hides the entire list of items to be ordered which is contained in Item 225, the list of selected items box. This hiding is done in the invention via this link or via an administrative setting. This hiding allows the administrator to avoid having users need to be exposed to the items that they are ordering. This has benefits such as minimizes training and avoiding some privacy and security issues.

The section shown in Item 225 can include items that have been selected to appear on the screen, but currently have a quantity of zero. This enables the user to use the Add/Delete feature shown in Item 207, particularly the Add feature in this case, to add one of these items, bringing the total of this item ordered to one. This process avoids the user having to go to a different screen to add optional services.

Item 209 shows data fields that have a presentation attribute of "Required". The invention prioritizes presentation attributes. For instance, if Field 1 shown as Item 210 had a presentation attribute for Good 1 of Optional and a sharing presentation attribute of "Shared", while it had a presentation attribute for Service 2 of Required and a sharing presentation attribute of "Shared", the system would make the following determination. It would first determine that these are duplicate fields and need not be listed twice. It would check the database settings to determine that Required has a higher priority than Optional and thus present it as a Required field. It would also check other presentation attributes such as color and others and select the ones which have the higher priority and use these to present the field on this data entry screen.

Item 211 shows Field 2 which might just be a field that is Required for Service 2 and is designated to appear in the Shared section.

Items 212 and 213 show a field which is specific to Service 1 but can be presented in the shared section. This field might be something that is similar to the other shared fields, but is needed each time Service 1 is ordered.

Item 214 shows data fields that have a presentation attribute of "Optional". Items 215 and 216 show fields that are optional.

Item 217 shows a Service Specific Section. These are fields that are much different than the other fields that are presented together and thus have a presentation attribute to be presented in this screen in their own section. An example might be a Professional Reference part of a background check. The shared information above might describe the applicant, but this section describes the person to be contacted for the Reference and thus is easier for the user to input if they see a visual difference.

Items 218 and 220 shows that even in the Service Specific Section, the data can be Required or Optional. Items 219 and 221 show fields for this service. The presentation attributes might have Item 221 shown in a light gray color, or even hidden, because it does not have the importance as the other fields.

Item 223 shows a hold order button. If the user enters some data into the form and then clicks this button, this data will be saved during this and successive logons until they click Item 224 to reset the page, or Item 222 to submit the order.

The fields on this page can also be dependent on each other. So if Field 2 has a value greater than 7, then Field 4 is now Required.

Items 201 and 202 show links to different tabs. These tabs display alternate data entry screens that have the same behavior as this screen, but can have a different list of items and the user can name the tabs with names they enter and elect to save via the invention.

The invention can be implemented as a website; that is an application running on a web server, using a database, accessible by users via an Internet browser. Although this architecture is widely known in the field, and can be accomplished using many different frameworks, a detailed description is provided herein as an example using the ASP.NET 2.0 framework, the details of which can be found in McDonald [Matthew McDonald, 2006, "Beginning ASP.NET 2.0 in C #2005", published by Apress]. This documentation includes implementation guidance for the framework that is introduced in US Patent Application 20040268228.

The invention claimed is:

1. A method for single-screen ordering of background checking services of a potential employee:
   creating a plurality of background checking service packages each having a plurality of data entry fields designated as either required or optional;
   designating a plurality of employment roles, wherein each employment role from the plurality of employment roles is assigned with a set of at least two background checking service packages from the plurality of background checking service packages;
   authenticating a username and a password of a recruiter;
   receiving a selection from the recruiter of one of the plurality of employment roles;
   in response to the selection, creating a single-screen ordering page for ordering a background check on the potential employee, wherein creating the single-screen ordering page includes:
      selecting for placement on the single-screen ordering page a set of data entry fields from the plurality of data entry fields associated with the set of at least two background checking service packages assigned to the selected employment role;
      identifying and removing by a computer processor one or more duplicate data entry fields from the set of data entry fields;
   fulfilling an order received from the single-screen ordering page for the background check on the potential employee by the recruiter.

2. The method of claim 1, wherein creating the single-screen ordering page further includes prioritizing placement of each data entry field in the set of data entry fields based on whether the respective data entry field is designated as required or optional.

3. The method of claim 1, wherein creating the single-screen ordering page further includes:
   a save link which when clicked saves any data entered on the single-screen ordering page;
   a logout link which when clicked logs a user out.

4. The method of claim 1, further comprising erasing any data previously entered on the single-screen ordering page.

5. The method of claim 1, further comprising erasing a previously selected background checking service package from the selected employment role.

6. The method of claim 1, further comprising adding an additional background checking service package to the selected employment role.

7. The method of claim 1, further comprising creating and saving default values for any of the set of data entry fields.

* * * * *